United States Patent Office 3,511,642
Patented May 12, 1970

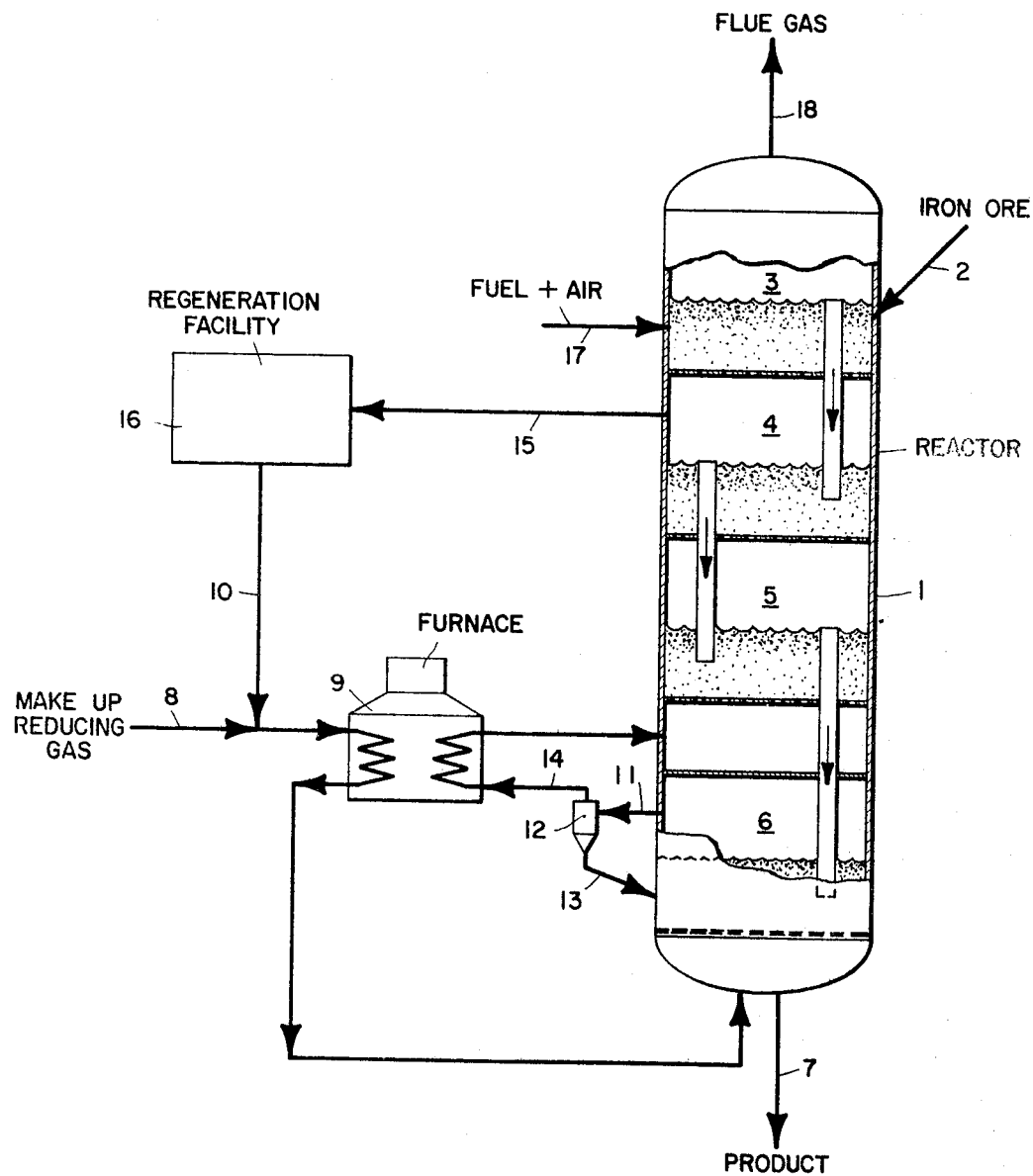

3,511,642
FLUID IRON ORE REDUCTION WITH INVERSE TEMPERATURE STAGING
Lewis D. Etherington, Westfield, N.J., assignor to Esso Research and Engineering Company, a corporation of Delaware
Filed Nov. 17, 1966, Ser. No. 595,214
Int. Cl. C21b 13/04, 13/14
U.S. Cl. 75—26                                    4 Claims

ABSTRACT OF THE DISCLOSURE

Iron ore is reduced by an endothermic reaction in a series of fluidized bed stages wherein the ore and gas pass counter-current. Bogging is reduced by operating the final reduction stage at 900° to 1100° F. The reducing gas from the final stage is heated prior to passing to succeeding stages thereby providing a higher temperature of operation in said succeeding stages than in said final stage.

---

This invention relates to the direct reduction of particulate iron ores. More particularly, it relates to the reduction of particulate oxidic iron ores by hydrogen-containing reducing gases in fluidized beds.

It is well known to reduce particulate iron ore through its several oxidation states in fluidized beds by contacting it with hot reducing gases such as hydrogen, carbon monoxide, or mixtures thereof, at temperatures ranging from about 900° to 1800° F. Such reduction is generally accomplished by passing the ore downwardly through a series of fluidized beds countercurrent to the flow of ascending hot reducing gases. The gases fluidize and heat the iron ore in the beds as well as reduce it. The ore is generally introduced at ambient temperature to the top of such series at its highest oxidation state and is progressively heated to higher and higher temperatures and reduced as it descends through the reactor according to the various reactions:

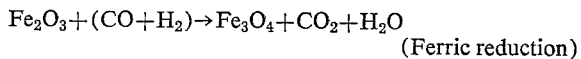
(Ferric reduction)

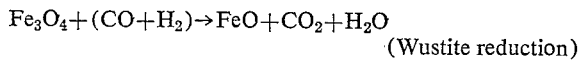
(Wustite reduction)

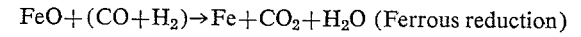 (Ferrous reduction)

The first reaction step, referred to as "Ferric reduction," occurs in the top or initial reduction zone of the reactor, whereas "Wustite reduction" takes place in an intermediate zone. The last reaction step, "Ferrous reduction," is carried out in a lower reactor zone. Thus, the final or lowest stage of the reactor generally contains product of the highest metallization. The term "metallization" as used herein refers to the percentage of total iron in the product which is present as metallic Fe. Such stage is also generally at the highest temperature. The bottom stage may be at a temperature as high as 1500° to 1800° F., while the temperatures in the upper reduction stages progressively decrease to about 1000° to 1300° F. or even lower at the top of the reactor.

In conventional processes the reducing gases will generally be rich in carbon monoxide and/or hydrogen. The use of gases containing excessive carbon monoxide, however, can present problems due to the tendency of carbon monoxide to revert to carbon and carbon dioxide under certain conditions. It is, therefore, desirable to use hydrogen-rich reducing gas, including carbon monoxide substantially diluted with hydrogen. The use of a diluent gas such as hydrogen thermodynamically reduces the tendency of carbon monoxide to undergo such reversion.

However, disadvantages are also encountered in the use of hydrogen-rich gas as iron ore reductant. The reduction of iron ore with hydrogen is endothermic and tends to cause a decrease in temperature of the reaction mixture. It is usually advantageous to provide any required reduction heat largely by preheating the reducing gas feed, and thereby to operate the reactor substantially adiabatically; that is, it is desirable to avoid the addition of a large fraction of the required reactor heat by indirect means such as immersing heating coils in the solids beds. However, the result of adiabatic reactor operation is that the major reduction stages progressively decrease in temperature from bottom to top as the ascending reducing gas is cooled. For example, the bottom or final reduction step is the hottest, about 1400° to 1500° F., and the topmost ferrous reduction stage is only about 1000° to 1200° F. Process kinetics and equilibria considerations dictate the desirability of maintaining the upper ferrous reduction and Wustite reduction stages above about 1100° F., preferably 1200° to 1400° F. Thus, if hydrogen-rich reducing gas is used, it may be necessary to preheat the reactor feed gas excessively in order to supply reduction heat and ore sensible heat, and to maintain the upper reduction zones at suitable temperature levels.

Excessive feed gas preheating is undesirable not only because of difficulties encountered with materials of construction at high preheat temperatures, but also because it results in the final bottoms product leaving the reactor at temperatures of 1300° to 1500° F., or higher, this wasting product sensible heat and lowering the overall thermal efficiency of the reduction process. Furthermore, high reactor temperatures in the vicinity of 1300° to 1500° F. promote bogging and sticking, particularly when the product is highly metallized. The term "bogging" is used to indicate the solids action wherein large lumps are formed which defluidize the solids beds and sometimes render them inoperative. Although not molten, highly metallized product has "stickiness" properties around 1300° to 1500° F., which causes fouling of reactor grids, cyclones, diplegs and reactor wall surfaces. Solids sticking and bogging tendencies have been observed to increase in the presence of richer hydrogen atmospheres.

Another very severe problem which may result when the reduced ore product is high metallized is that final FeO reduction to metal may slow down to an impractical rate considerably short of complete metallization even in a strong reducing atmosphere when the last stage of reduction is maintained at high temperatures, e.g., in the range of 1300° to 1500° F.

If the reactor feed gas temperature is lowered to avoid the various problems of excessive gas preheat and bottoms-product overheating, temperatures in the upper reduction zones may drop below optimum levels and create other problems when using hydrogen-rich reducing gas and adiabatic reactor operation. For example, temperatures in the range of 1100° to 1400° F. are desired for Wustite and initial ferrous reduction (reduction up to about 80% metallization) to achieve more favorable equilibria, good reaction rates and low zone residence times for the solids.

As the temperature is lowered in the Wustite and initial ferrous reduction zones, there is a decrease in the maximum hydrogen conversion per reactor pass due to poorer reduction equilibria. Thus, with reduced reactor temperatures for Wustite and initial FeO reduction, it is necessary to circulate more hydrogen through the reactor and external hydrogen recycle purification system in order to get the desired ore reduction.

These design considerations present somewhat of a dilemma when using hydrogen-rich reducing gas; thus, in avoiding excessive feed gas preheat and product overheating, the upper reactor temperature may drop below optimum levels. It is desired to overcome these problems by methods that are not mechanically or operationally complex, and that are competitive in cost with substantially adiabatic reactor operation.

It has now been surprisingly found that these difficulties can be minimized and many advantages can be realized by carrying out Wustite reduction or Wustite and initial ferrous oxide reduction in a premetallizing zone and effecting further product reduction to about 85 to 99+% metallization in a succeeding zone at a temperature in the range of about 900° to 1100° F., preferably 950° to 1050° F., and lower than the temperature of the premetallizing zone.

This invention thus contemplates partially or completely inverting the normal or conventional reactor temperature profile, particularly in the Wustite and ferrous oxide reduction zones. The inverted profile of this invention provides Wustite reduction zones or Wustite and initial ferrous reduction or premetallizing zones wherein fluidized ore solids containing Wustite are reduced in stages with a hydrogen-rich gas containing at least about 30 mole percent, preferably 40 to 90 mole percent, hydrogen at temperatures ranging from about 1100° to about 1400° F., preferably 1200° to 1400° F., to a partially reduced or premetallized state of up to about 80%, preferably 40 to 80%, metallization, the partially reduced ore then descending to a succeeding zone maintained at a temperature ranging from about 900° to 1100° F. in which the ore is further reduced to about 85 to 99+% metallization.

By carrying out the process according to this invention it is possible to maximize product metallization and hydrogen conversion per reactor pass. Thus, at 900° to 1100° F. the final ore reduction with hydrogen proceeds more rapidly towards substantially complete metallization with much less reactor fouling and solids bogging than are encountered at usual bottom stage reactor temperatures of 1300° to 1500° F. Moreover, reduced product leaving the reactor at , e.g., 1000° F., carries out of the reactor about 35% less sensible heat than does a corresponding product at 1500° F.

As the reaction proceeds, the $H_2O$ partial pressure increases and approaches a point at which the $H_2/H_2O$ equilibrium conditions would be so unfavorable that any further hydrogen conversion would be severely limited at 900° to 1100° F. The reducing gases then ascend to the premetallizing zone which is maintained at higher temperatures at which the equilibrium $H_2/H_2O$ ratio is favorable to Wustite and initial ferrous oxide reduction.

In a particularly preferred embodiment of this invention the premetallizing zone comprises a plurality of stages maintained in the temperature ranges indicated below for the average metal oxide compositions shown:

| Average oxide leaving stage: | Preferred minimum temp. range, ° F. |
|---|---|
| $FeO_{1.07}$ to $FeO_{1.16}$ | 1100–1150 |
| $FeO_{1.06}$ to $FeO_{1.07}$ | 1150–1200 |
| $FeO_{0.8}$ to $FeO_{1.06}$ | 1200–1400 |

By carefully controlling temperatures of the stages of the premetallizing zone consistent with the above table, very high hydrogen conversion per reactor pass is achieved, requiring minimum reactor diameter, feed gas rate, and minimum recycle gas equipment for a given number of reactor stages. For example, in using pure hydrogen reducing gas to achieve 95% product metallization in a typical reduction where the partially reduced ore leaves the top premetallizing stage with an average molecular composition of $FeO_{1.07}$, the required reducing gas feed rate has to be increased more than 30% when the temperature of the top premetallizing stage is lowered from 1150° to 1040° F. Alternately, in maintaining stages of the premetallizing zone at the preferred conditions, the number of reactor stages may be reduced or final product metallization may be improved with a minimum increase in reactor feed and recycle gases.

Depending on the final product metallization desired, gas ultiliztion per reactor pass can be maximized in accordance with this invention by carrying out a maximum fraction of the final ferrous oxide reduction which will occur at high kinetic rates at the low 900° to 1100° F. temperatures, Wustite reduction and initial ferrous reduction being carried out at higher temperatures in the premetallizing zone.

It is also desired to carry out the initial ferrous reduction in the premetallizing zone at temperatures above 1100° F. in order that the final reduced product will not be pyrophoric and subject to spontaneous combustion or rapid oxidation, as is often the case with ores reduced entirely at temperatures below 110° F. with a hydrogen-rich reducing gas.

Even if the feed ore to the top reduction zone is preheated up to about 1600° F. and the final or bottom reduction zone operates at 900° to 1100° F., it is usually not possible to realize desired temperatures above about 1100° F. at the top of the Wustite and ferrous premetallizing zone when this zone is operated substantially adiabatically with hydrogen-rich reducing gas. That is, the net endothermic heat of reduction with hydrogen-rich gas cools the upper premetallization stages to temperatures below the desired range. Thus, it is usually necessary to add a portion of the required reactor heat to the premetallizing zone for best results when operating the final ferrous reduction zone at 900° to 1100° F. and when not preheating the ore feed excessively above 1500° to 1600° F.

There are other methods of controlling the reactor stage temperatures other than high preheat of the reactor feed ore or reducing gas. For example, the individual reactor stages may be maintained at desired temperatures by indirect heat exchange, such as by hot gas passing through coils immersed in the fluidized solids within the reactor stages. A more preferred means of reactor temperature control involves withdrawal of reducing gas from an intermediate stage or bottom stage, or both, heating this gas externally and returning the heated gas to the reactor near the point of withdrawal. Alternately, another preferred means of reactor temperature control is to inject oxygen gas into the Wustite and/or ferrous premetallizing stages in small controlled amounts to cause combustion of parts of the reducing gas within the reactor with resultant heat release to offset the endothermic cooling effect of ore reduction. Thus, different reactor zones or stages are controlled at temperatures which are optimum or near-optimum for their particular functions.

The invention will be better understood with reference to the attached drawing which shows an embodiment wherein reducing gas is withdrawn from one zone of a fluidized iron ore reduction reactor, heated, and reintroduced into a higher zone of the reactor.

Specifically, iron ore is introduced into the reactor 1 by means of line 2. The ore descends through the preheating zone 3 where it is heated to reduction temperatures of about 1500° F. Partial reduction of the ore to magnetite ($Fe_3O_4$) may also occur in this zone. From preheat zone 3 the ore descends into the ferric reduction zone 4 where it is substantially reduced to $Fe_3O_4$ at temperatures of about, e.g., 1100° to 1300° F.

The $Fe_3O_4$ and any residual ferric oxide then descends into premetallizing zone 5 where they are reduced below FeO to about 60% metallization at temperatures ranging from about 1200° to 1400° F. The ferrous oxide and metallic iron from zone 5 then passes to zone 6 where final metallization occurs at temperatures ranging from about 900° to 1100° F. Metallized product of about 90 to 99% metallic iron is withdrawn through line 7 to briquetting, handling and storage or steel-making facilities (not shown).

Fresh make-up reducing gas comprising about 70 mole percent hydrogen is introduced to the process via line 8. The make-up gas and recycle reducing gas in line 10 then pass through furnace 9 and are heated to temperatures ranging from about 1100° to 1300° F. The preheated gases are fed to the bottom of the reactor. The reducing gases ascend through the final metallization zone 6 and are withdrawn through line 11 to cyclone 12 at about 900° to 1100° F. The cyclone discharges solids through line 13 back to zone 6; simultaneously reducing gas passes via line 14 through furnace 9 wherein it is heated to higher temperatures ranging from about 1200° to 1500° F. The heated gas is then introduced into the bottom of zone 5 and ascends to zone 4, fluidizing and reducing the ore within these zones. Part or all of the gases from zone 4 are then withdrawn by means of line 15 and regenerated in facility 16 to remove any oxidized components, e.g., water and carbon dioxide also when carbon monoxide is used in the reducing gas, and then recycled through line 10 and furnace 9 back to the bottom of the reactor. At least a portion of the gases leaving zone 4 may be allowed to ascend into preheating zone 3 to aid in the fluidization, partial, reduction and preheating of the incoming ore. It may be preferable to add additional fuel and oxygen or oxygen-containing gas such as air at inlet 17 in the ore preheating zone to provide heat and fluidizing gases therein, thereby minimizing the amount of more expensive reducing gas which is to be introduced from zone 4. The spent gases from preheating zone 3 are withdrawn via line 18 as flue gases and pass to heat recovery and disposal facilities (not shown).

Various methods may be employed to maintain the inverted temperature profile according to this invention. One method is to preheat the iron ore feed to very high temperatures before it descends into the top or initial reduction zone. For example, a typical ore feed might be heated and dried at 1600° F. in a top reactor stage by combustion of a fluid fuel and air injected into the top fluid bed, or by combustion of at least a part of the spent reducing gases ascending from the upper reduction stages into the preheat stage. Simultaneously, the hydrogen-containing reducing gas can be introduced to the bottom of the reactor at relatively cold temperatures to result in a bottom reducing zone at a temperature within the range of about 900° to 1100° F. For example, the gas can be fed to the bottom of the reactor at 1100° to 1300° F., rather than the usual 1400° to 1600° F. The net endothermic reaction heat in the bottom zone would then cool the reactants to the desired 900° to 1100° F. Precise ore and gas temperatures depend, of course, upon relative feed rates of each, reactor heat losses, the particular composition of the reducing gas, etc. In any case, the temperatures can be determined by straight-forward engineering calculations and minimal experimentation; i.e. determination of heat balances.

To achieve the desired inverted temperature profile, comparatively low temperature reducing gas can be fed to the bottom of the reactor while injecting oxygen into one or more stages of the ferric reduction zone and/or the premetallizing zone to partially combust reducing gases in such zone and release large quantities of heat. Generally only small quantities of oxygen are required, whether added with other gases as in air or as essentially pure oxygen; for example, about 0.005 to 0.02 mole of oxygen per mole of reducing gas, upon reaction with hydrogen releases enough heat to increase the reducing gas temperature by about 100° to 500° F. without significantly lowering its reducing power.

Still another method, as shown in the drawing, is to withdraw reducing gas from the lower 900° to 1100° F. zone, heat it externally, e.g., in a furnace, and then introduce it into the premetallizing zone at temperatures ranging from 1200° to 1600° F. This technique has the advantage of utilizing the maximum reducing power of the feed gas since it does not require partial oxidation of the reducing gas to generate heat.

Many other modifications will be apparent to those skilled in this art, and it is intended that the full scope of the invention be given to the attached claims.

What is claimed is:

1. In a process for the production of metallic iron wherein particulate oxidic iron ore is fluidized and reduced in an endothermic reaction in a series of staged zones of fluid beds from a higher oxide state through ferrous oxide by a stream of hydrogen-rich reducing gas, the improvement which comprises reducing the ore to a partially reduced product of from about 40% to 80% metallization in a premetallizing zone of said series of beds and then further reducing said partially reduced product to 85 to 99+% metallization in a succeeding zone of said series of beds, said succeeding zone being maintained at a temperature in the range of 900° to 1100° F. and lower than the temperature of said premetallizing zone and wherein said reducing gas is withdrawn from said succeeding zone, directly heated to a temperature in the range of 1200° to 1600° F. and added to said premetallizing zone.

2. The process of claim 1 wherein said premetallizing zone is maintained at a temperature in the range of 1100° to 1400° F.

3. The process of claim 1 wherein said reducing gas comprises at least about 30 mole percent hydrogen.

4. The process of claim 3 wherein said reducing gas contains from about 40 to about 90 mole percent hydrogen.

References Cited

UNITED STATES PATENTS

| | | | |
|---|---|---|---|
| 2,965,449 | 12/1960 | Jukkola | 75—26 X |
| 2,996,373 | 8/1961 | Agarwal | 75—26 |
| 3,020,149 | 2/1962 | Old et al. | 75—26 |
| 3,021,208 | 2/1962 | Feinman | 75—26 |
| 3,076,702 | 2/1963 | Hemminger | 75—26 |
| 3,224,870 | 12/1965 | Johnson et al. | 75—26 |
| 3,341,322 | 9/1967 | Bailey | 75—26 |
| 3,364,011 | 1/1968 | Porter et al. | 75—26 |
| 3,389,988 | 6/1968 | Cambon et al. | 75—26 |

HENRY W. TARRING II, Primary Examiner